United States Patent
Cammi

[11] 3,782,862
[45] Jan. 1, 1974

[54] ANTI-THEFT DEVICE

[76] Inventor: Ferdinando Cammi, Via Cipelli 20, Piacenza, Italy

[22] Filed: Jan. 28, 1972

[21] Appl. No.: 221,720

[30] Foreign Application Priority Data
　　Feb. 4, 1971　Italy.............................. 20173 A/71

[52] U.S. Cl. ............ 417/313, 70/237, 123/139 AZ, 180/114
[51] Int. Cl. ...................... B60r 25/00, F02m 63/02
[58] Field of Search ................ 70/237, 242, 293, 70/244, 254, 255; 180/114; 123/198 B, 139 AZ; 417/313

[56] References Cited
UNITED STATES PATENTS
| | | | |
|---|---|---|---|
| 2,236,553 | 4/1941 | Voit et al. ..................... | 123/139 AZ |
| 1,000,523 | 8/1911 | Illsley .............................. | 123/198 B |
| 1,967,101 | 7/1934 | Rassbach......................... | 123/198 F |

Primary Examiner—William L. Freeh
Assistant Examiner—Leonard Smith
Attorney—Guido Modiano et al.

[57] ABSTRACT

An anti-theft device particularly for vehicles with injection engines utilising a rack rod for adjusting the fuel feed thereof comprising a key-operated lock member for the rack rod adapted to lock it on command in a position which blocks the fuel feed.

2 Claims, 5 Drawing Figures

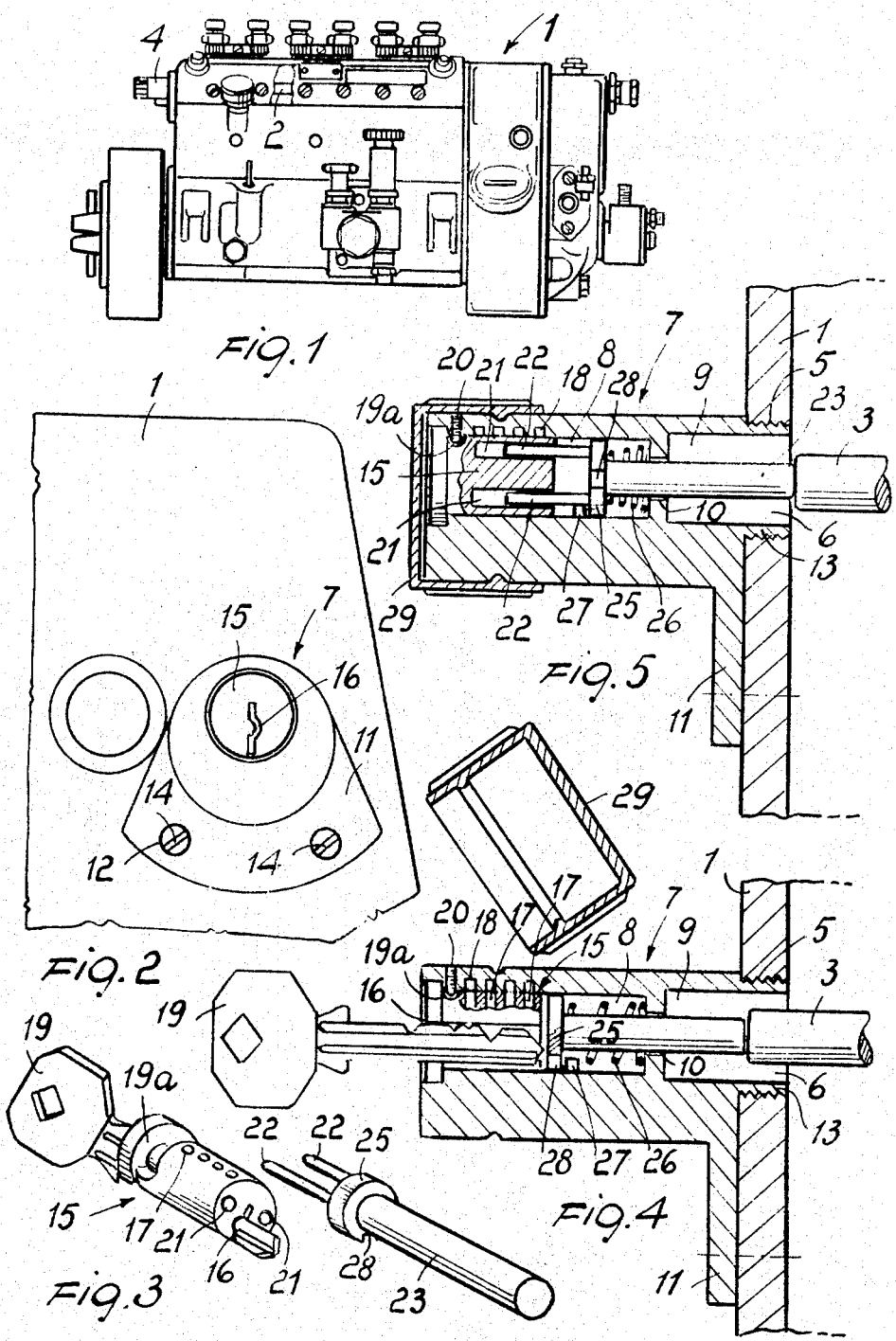

ANTI-THEFT DEVICE

BACKGROUND OF THE INVENTION

The present invention relates to an anti-theft device particularly for vehicles with injection engines.

Anti-theft appliances of the most varied nature have been devised for preventing the theft of vehicles of all types. These appliances are of the mechanical, electrical or similar type and are intended to lock various members of the vehicle engine, such as the steering wheel, gear lever, electrical system and the like. However the majority of these devices, although in themselves ingenious, do not completely resolve their purpose. In fact they mostly comprise devices which, either because they are easily accessible by a thief, or because it is possible to turn their protective key, do not completely protect the vehicle on which they are mounted. The same problems arise in industrial vehicles, with the addition that their theft not only results in the damage due to the loss of the vehicle but also the damage due to the loss of the load.

SUMMARY OF THE INVENTION.

The present invention offers a solution to this problem, which is particularly intended for vehicles utilising injection engines in which the engine comprises a pumping assembly in which the fuel feed is ensured amongst other things by the movement of a so called "rack rod", which acts on the pumping elements (by adjusting their degree of opening and hence the flow of fuel).

Another object of the invention is to provide an anti-theft device which combines the advantages of true inviolability with a very simple structure, and does not require substantial modifications to the engine to which it is to be applied.

According to the invention there is provided an anti-theft device, particularly for vehicles with injection engines utilising a rack rod for adjusting the fuel feed, comprising an engagement member for said rod adapted to lock it on command in a position which blocks the feed.

Advantageously said device comprises a lock or the like co-operating with means which engage with one end of said rod, and accessible from outside the pump assembly.

DESCRIPTION OF THE DRAWING

The invention will be more evident from the detailed description given hereinafter of a preferred but not exclusive embodiment of an anti-theft device according to the invention, illustrated by way of not limiting example in the accompanying drawing in which:

FIG. 1 shows diagrammatically a pump unit of conventional type, to which the device according to the invention is applied;

FIG. 2 shows a diagrammatic view of one end (turned through 90° with respect to FIG. 1) of a part of the pump unit, in which the applied device is visible;

FIG. 3 shows an exploded detailed view of two of the components which constitute the device;

FIG. 4 shows a section through the device in a vertical plane, in the rest position (anti-theft device non-connected);

FIG. 5 shows a section through the device as in FIG. 4, but with the anti-theft device in the working condition (vehicle locked).

DESCRIPTION OF THE PREFERRED EMBODIMENTS

FIG. 1 shows a pump unit of conventional type as applied to internal combustion engines with injection feed (which generally comprise engines for lorries and the like). The so called rack rod adjusting fuel delivery from the pump to the engine by acting on the degree of opening on the pumping elements is situated in the upper part of the pump unit, indicated overall by the reference numeral 1, and extends longitudinally.

This is well known and will not be described. The rack rod (of which a short length 2 is visible in FIG. 1, supposing a gap to have been made in the upper part of the unit 1) moves axially passing from a position in which the feed of fuel is blocked (a position corresponding to the maximum movement towards the right in FIG. 1) to a position of maximum delivery (maximum movement towards the left of said rod 2). In passing from the first to the second of said positions, the end 3 of the rod 2 projects from the block of the unit 1, and consequently a blind bush 4 is normally provided in the path through which the end 3 projects outside the bush 1, and is screwed into the thread 5 provided in the hole 6 in the wall of the pump unit.

The device hereinafter described is easily applied to the pump unit 1, by taking the place of the blind bush 4 (which is removed), as will be more evident hereinafter.

The device in question comprises substantially a cylindrical sleeve member or housing block generally indicated by the reference numeral 7, having two internal cylindrical cavities 8 and 9 which are successive and coaxial to the rack rod 2, and separated by an annular shoulder 10. A sector member 11 provided with a pair of through holes 12 is formed in the lower part of said bush 7 as a single piece with it. The member 7 is provided at its end with a male thread 13 which screws into the pre-existing thread 5 of the hole 6 of the pump body 1.

In this manner the member 7 is screwed into the body 1 (replacing the blind bush 4) and once tightened in position is further fixed by a pair of screws 14 which, by insertion in said holes 12 of the sector member 11, stabily fix the member 7 to the wall of the body 1. Finally the complex is sealed.

Inside the chamber 8 a cylindrical key-operated locking member 15 is inserted of the type commonly used in cylindrical safety locks. It is provided with a slot 16 which receives a key 19, and a plurality of seats 17 to which two series of fixed seats 18 correspond. Pins housed in the seats 17, 18 allow the block 15 to be rotated by the correct key 19. A suitable guide 19a, engaged by a fixed pawl 20, allows the rotation of the block 15 to be limited to the required value, for example an angle of 90°.

Two holes 21 are formed in the block 15, and in these holes two rods are inserted projecting from a rod-like member 23. More precisely, between the rods 22 and the member 23 a circular expansion piece 25 is provided, and a helical spring 26 is wound about the rod 23 between the expansion piece 25 and the annular stop 10.

A projecting pin or pawl 27 extends from the bottom of the chamber 8 and a notch of complementary form 28 is provided peripherally in the enlarged head 25.

The device is completed by a protective cap 29 which is fixed, possibly by snap engagement, to the end of the member 7 so as to cover the lock when the key 17 is absent, so preventing any dirt entering the mechanism.

The device operates in the following manner.

When the anti-theft device is in the inactive condition it assumes the disposition shown in FIG. 4. In this condition, the rod member 23, subjected to the thrust of the spring 26, is withdrawn towards the left in a first or rest position in which it is withdrawn from the end of the rack rod 3, which can consequently freely carry out its axial movements, so guaranteeing that the engine is fed with fuel according to its requirements. In this condition the key 19 may be partially inserted in the lock, or preferably completely disinserted and the lock covered with the cap 29. It can be seen that in this condition the enlarged head 29 is to the left side of the fixed pawl 27, the notch 28 being aligned in the axial direction with said pawl.

Suppose that the vehicle is now to be locked by closing the anti-theft device. Because of the disposition of this latter on the pump unit it is necessary to reach inside the engine space, insert the key 19 into the lock cylinder 15 and push the key to the bottom, so that it thrusts the rod like member 23 ahead of itself (compressing the spring 26) with the rack rod 3 then being moved by said rod like member into a second position shown in FIG. 5 (completely to the right), in which position the fuel feed to the engine is blocked. When this has been done, the key has reached its final position in the axial direction, and the block 15 is freed in the rotary sense. The key is then turned through 90°, the block 15 reaches its second rotary limiting position and the key may be freely withdrawn. The anti-theft device however remains locked, because having also rotated the head 25, which in the preceding stage was moved to the right side of the pawl 27, said head can no longer withdraw, and remains locked in the position shown in FIG. 5, which corresponds to maximum closure of the pumping elements. When a prolonged period of rest is scheduled, it is convenient to cover the lock with the cap 29 when the key 19 has been withdrawn. It is evident that any attempt to tamper with the anti-theft device can only result in failure. Firstly it is necessary in order to reach the anti-theft device to open the door and then the engine bonnet, which is not always possible and in any case requires a certain time. However if this operation was successfully accomplished, it is evidently quite impossible to unlock the anti-theft device without possessing the key, and even more evident when one considers the normally inaccessible position in which the pump unit is located in the engine and which does not allow tampering of the lock with the normal tampering devices.

On the contrary, with the key it is possible by simply rotating through one quarter of a turn to reset the components in the position shown in FIG. 4, in which the notch 28 is centered with the member 27 and the rod-like member 23 is returned to the withdrawn position as soon as the spring 26 expands after withdrawing the key 19.

In a preferred modification of the invention, the appendix 29 is replaced by a blind hole or engagement seat in the cylindrical internal wall of the bush member 7 and the cylindrical block 15 is replaced by a cylindrical block provided with an elastically withdrawable pin with the tendency, due to spring action, to project transversely from the cylindrical block of the safety lock, said pin being located on the same generating line as said engagement seat. The cylindrical block is resiliently mobile axially, in a similar manner as the precedingly described block 15, with the difference that it is no longer necessary to use the key in order to push it into the closed position but is sufficient to press on the block until it is brought into the position in which its engagement pin snaps into said engagement seat, so locking the block in this position. The key is used only for opening the device in order to withdraw the pin, the spring 26 automatically pushing the block into the open position. Guide means are obviously provided for axially guiding the cylindrical block and preventing its rotation.

The member 23 with the rods 22 may be completely eliminated for reasons of bulk.

In a further modification the axis of the bush member may be disposed transversely to the rack, the block when in the closed position locking the axial movement of the rack 3 with its lateral surface, said rack being suitably prolonged by means of a rod fixed to its end.

The invention so conceived, applicable to pump units of any type, is susceptible to numerous modifications all of which fall within the scope of the inventive idea.

I claim:

1. An anti-theft device particularly for motor vehicles having an internal combustion engine and a fuel injection pump including a rack rod for adjusting fuel delivery from said pump to said engine, comprising means for locking said rack rod in an ineffective position in which no fuel is delivered from said pump to said engine, said means comprising a housing block fixed to said pump, a key-operated locking member arranged within said housing block and including a rod-like member capable of engaging said rack rod at one end thereof, said locking member being rotatable and axially displaceable within said housing between a first position in which said rod-like member is withdrawn from said end of said rack rod into a second position in which said rod-like member locks said rack rod in said ineffective position, means being provided for locking said locking member in said second position and for returning said locking member into said first position.

2. A device as claimed in claim 1, wherein said housing block fixed to said pump includes a cylindrical cavity arranged coaxially to said rack rod and receiving therein said means for locking said locking member in said second position and said means for returning said locking member into said first position, said locking means including a pin projecting into said cylindrical cavity for locking said rod-like member at one side of said pin in said second position and said returning means including a spring acting on said rod-like member and urging said rod-like member into said first position at the other side of said pin.

* * * * *